(12) United States Patent
Barker

(10) Patent No.: US 6,364,290 B1
(45) Date of Patent: Apr. 2, 2002

(54) BLOWING HEAD INCLUDING A BUCKLE DETECTOR

(75) Inventor: Philip A Barker, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/029,161
(22) PCT Filed: Sep. 17, 1997
(86) PCT No.: PCT/GB97/02507
  § 371 Date: Feb. 26, 1998
  § 102(e) Date: Feb. 26, 1998
(87) PCT Pub. No.: WO98/12588
  PCT Pub. Date: Mar. 26, 1998

(30) Foreign Application Priority Data

Sep. 19, 1996 (GB) ............................................. 9619596
Apr. 16, 1997 (GB) ............................................. 9707714

(51) Int. Cl.[7] ................................................. B66F 3/24
(52) U.S. Cl. .................................................. 254/134.4
(58) Field of Search ................. 254/134.3 R, 134.3 FT, 254/134.4, 268; 226/25, 43, 178

(56) References Cited

U.S. PATENT DOCUMENTS

| | | |
|---|---|---|
| 2,690,002 A | 9/1954 | Grenell et al. |
| 3,610,582 A | 10/1971 | Passoni |
| 3,654,114 A | 4/1972 | Brandstaetter |
| 3,793,732 A | 2/1974 | Hamrick |
| 4,082,423 A | 4/1978 | Glista et al. |
| 4,105,284 A | 8/1978 | Olshansky |
| 4,181,403 A | 1/1980 | Macedo et al. |
| 4,185,809 A | 1/1980 | Jonnes |
| 4,230,395 A | 10/1980 | Dean et al. |
| 4,248,035 A | 2/1981 | Skillen et al. |

(List continued on next page.)

FOREIGN PATENT DOCUMENTS

| | | |
|---|---|---|
| AU | 214452 | 2/1957 |
| AU | 231245 | 7/1958 |
| AU | 250437 | 9/1960 |
| AU | 37076/68 | 4/1968 |
| DE | 11-85312 | 1/1965 |
| DE | 1934818 | 1/1971 |
| EP | 0108590 A1 | 5/1984 |
| EP | 0157610 A2 | 10/1985 |
| EP | 0186753 A2 | 7/1986 |
| EP | 0253636 B1 | 1/1988 |

(List continued on next page.)

OTHER PUBLICATIONS

Kashyap et al, "Temperature Desensitisation of Delay in Optical Fibers for Sensor Applications", Electronics Letters, vol. 19, No. 34, Nov. 1983.

Yamamoto et al, "Optical Fibre Jacketed with Electronics Lett", vol. 19, No. 17, 8/83, pp. 674–675.

Cassidy et al, "A Radically New Approach to the Installation of Optical Fibre Using the Viscous Flow of Air", Telecom Technol J., vol. 2, Bi 1/84, pp.(4 pages).

Kashyap et al, "Single–Ended Fiber Strain & Length Measurement on Frequency Domain", Electronic Letters, vol. 16, No. 18, Aug. 1980.

Foord et al, "Principles of Fiber—Optical Cable Design", IEEE vol. 123, No. 6, Jun. 1976, pp. 597–602.

Hu et al, "Subducts: The Answer to Honolulu's Growing Pains", 7/80, pp. 23–35.

Primary Examiner—Robert C. Watson
(74) Attorney, Agent, or Firm—Nixon & Vanderhye P.C.

(57) ABSTRACT

A blowing head for a blown fibre installation, the blowing head including a buckling detector in the transmission line being installed and decreasing the drive forces applied to the transmission line, preventing mechanical damage occurring to the transmission line.

15 Claims, 10 Drawing Sheets

U.S. PATENT DOCUMENTS

| | | |
|---|---|---|
| 4,332,436 A | 6/1982 | Adorni et al. |
| 4,372,792 A | 2/1983 | Dey et al. |
| 4,408,378 A | 10/1983 | Ketteringham et al. |
| 4,414,942 A | 11/1983 | Itoh et al. |
| 4,446,686 A | 5/1984 | Panuska et al. |
| 4,552,433 A | 11/1985 | Titchmarsh et al. |
| 4,640,576 A | 2/1987 | Eastwood et al. |
| 4,659,174 A | 4/1987 | Ditscheid et al. |
| 4,691,896 A | 9/1987 | Reeve et al. |
| 4,702,404 A | 10/1987 | Einsle et al. |
| 4,756,510 A | 7/1988 | Klamm et al. |
| 4,796,970 A | 1/1989 | Reeve et al. |
| 4,850,569 A | 7/1989 | Griffioen et al. |
| 4,856,760 A | 8/1989 | Frost et al. |
| 4,934,662 A | 6/1990 | Griffioen et al. |
| 4,948,097 A | 8/1990 | Reeve et al. |
| 5,042,907 A | 8/1991 | Bell et al. |
| 5,109,456 A | 4/1992 | Sano et al. |
| 5,169,126 A | 12/1992 | Reeve et al. |
| 5,197,715 A | 3/1993 | Griffioen |
| 5,456,450 A | 10/1995 | Reeve et al. |
| 5,474,277 A | 12/1995 | Griffioen |
| 5,557,703 A | 9/1996 | Barker et al. |
| 5,645,267 A | 7/1997 | Reeve et al. |

FOREIGN PATENT DOCUMENTS

| | | |
|---|---|---|
| EP | 0287225 A1 | 10/1988 |
| EP | 0318280 A1 | 5/1989 |
| EP | 0319194 A1 | 6/1989 |
| EP | 0323028 A1 | 7/1989 |
| EP | 0338856 A2 | 10/1989 |
| EP | 0345968 A2 | 12/1989 |
| EP | 0521710 A1 | 1/1993 |
| GB | 747706 | 4/1956 |
| GB | 817938 | 8/1959 |
| GB | 1511615 | 5/1978 |
| GB | 2060966 A | 5/1981 |
| GB | 2086607 A | 4/1982 |
| GB | 2119949 A | 11/1983 |
| GB | 2122367 A | 1/1984 |
| GB | 2122370 A | 1/1984 |
| GB | 2157019 A | 10/1985 |
| GB | 2212940 A | 8/1989 |
| GB | 2212941 A | 8/1989 |
| GB | 2212942 A | 8/1989 |
| GB | 2293498 A | 3/1996 |
| GB | 2294131 A | 4/1996 |
| JP | 40-9359 | 5/1940 |
| JP | 40-9353 | 5/1965 |
| JP | 49-115697 | 11/1974 |
| JP | 51-76592 | 7/1976 |
| JP | 52-100994 | 8/1977 |
| JP | 54-145181 | 11/1979 |
| JP | 55-94157 | 7/1980 |
| JP | 58-22516 | 2/1983 |
| JP | 57-43005 | 9/1992 |

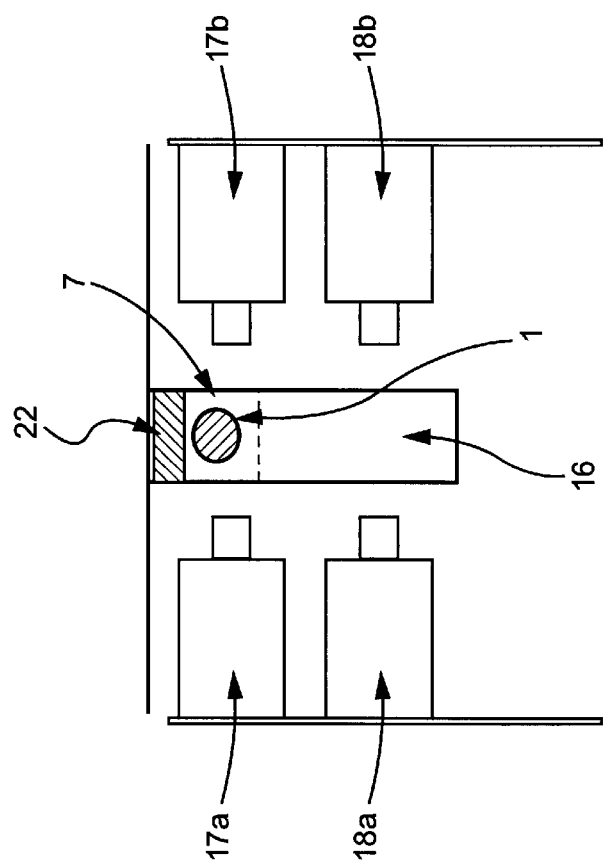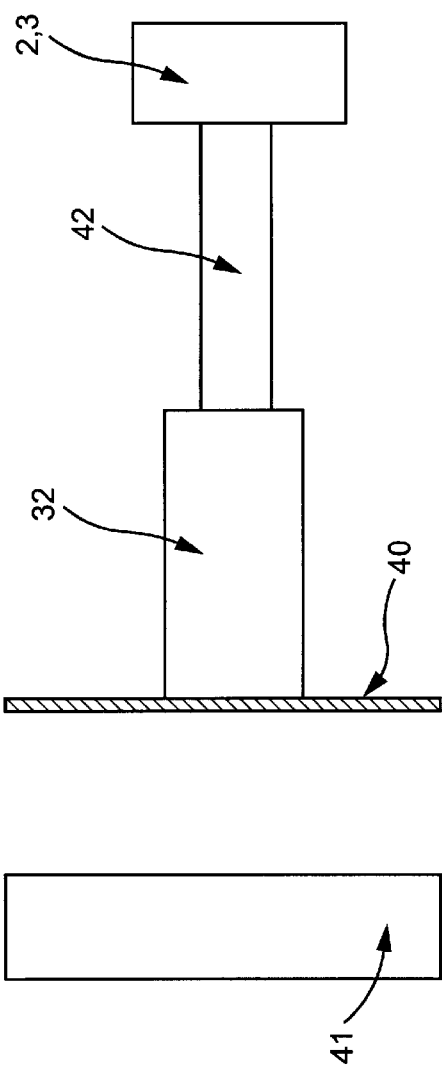

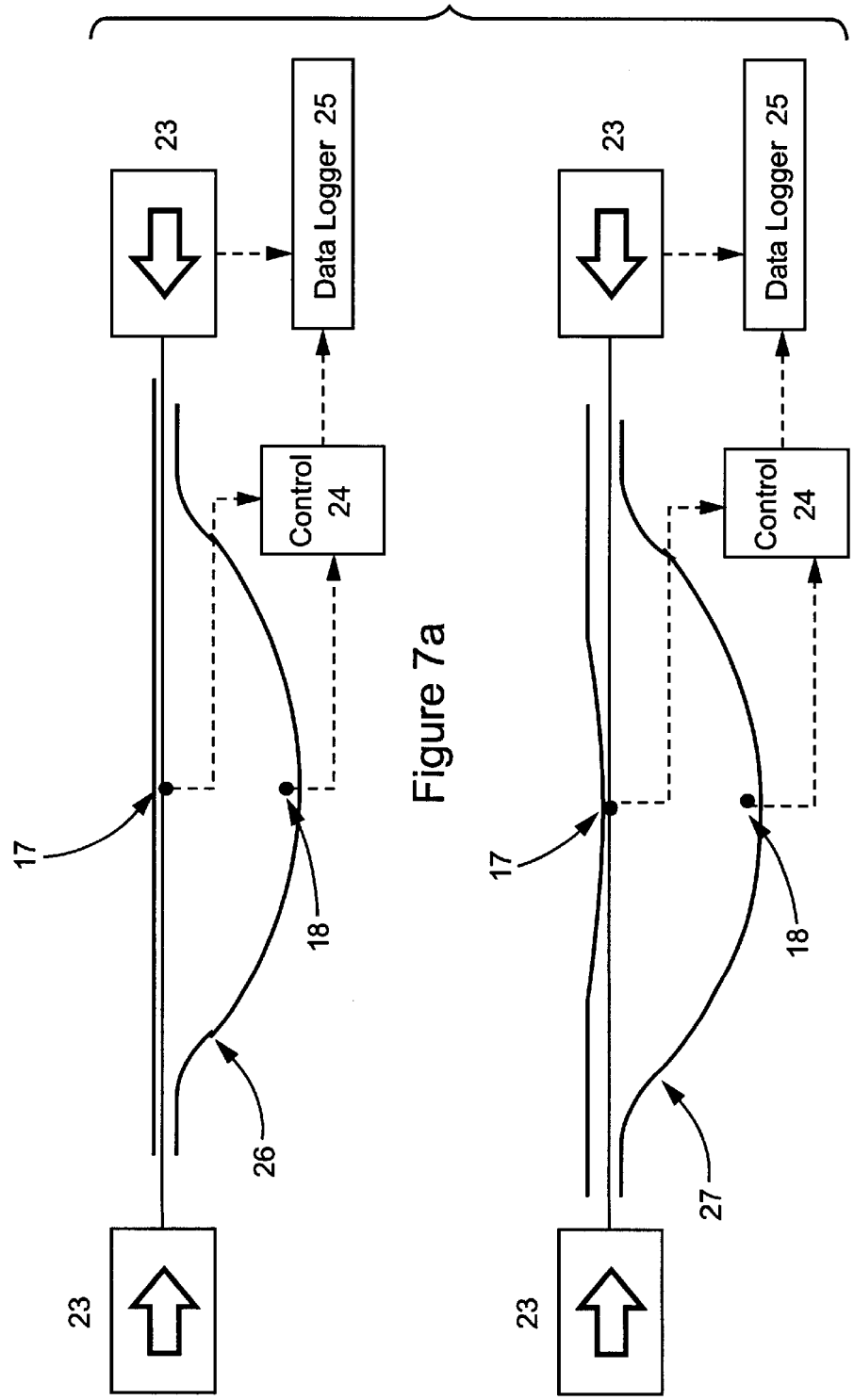

Figure 12
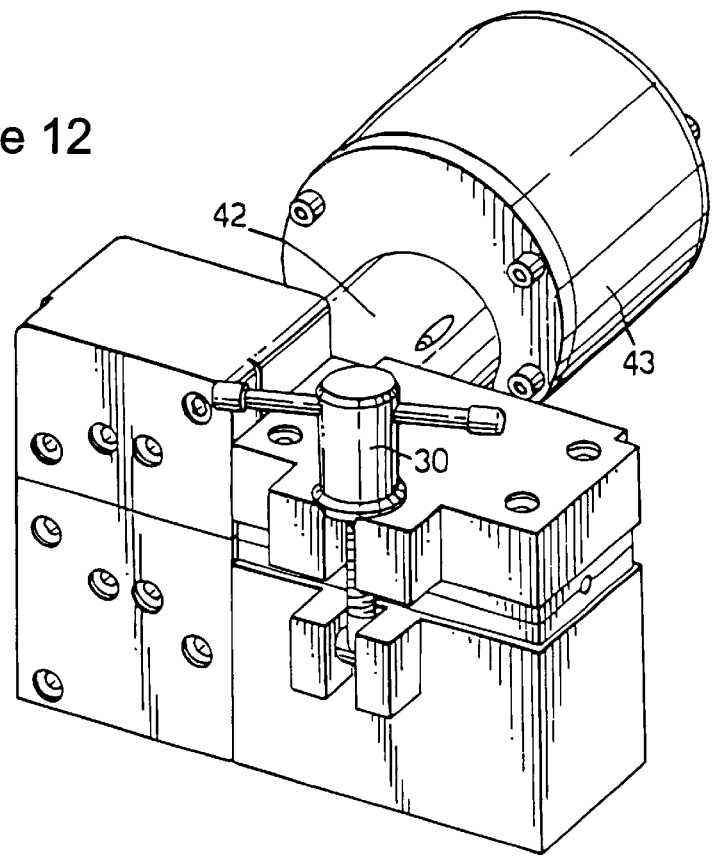
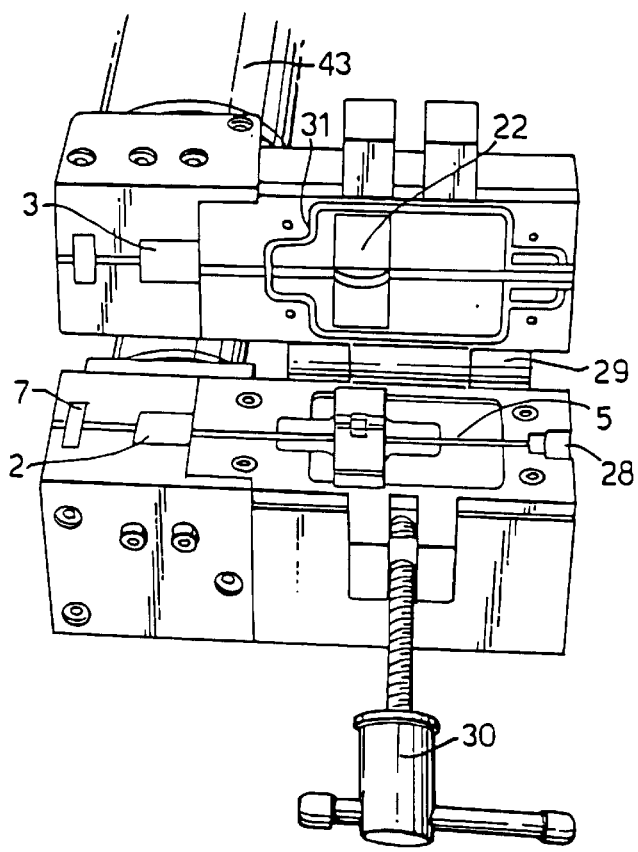
Figure 13

BLOWING HEAD INCLUDING A BUCKLE DETECTOR

BACKGROUND OF THE INVENTION

1. Field of the Invention

This invention relates to a blowing head for use in blown cable installations and to a buckle detector suitable for integration with such a blowing head.

2. Related Art

It is well known from European Patent EP-B-108590 and subsequent publications that optical fibre transmission lines can be installed into ducts using the fluid drag provided by a high-speed flow of a gaseous medium. This method is practiced with optical fibre and copper cables ranging in size from about 1 mm to 20 mm or more, depending upon the application and the route into which installation is to take place.

As described in EP-B-108590 a blowing head comprises a pair of motor driven wheels which provide a propulsive force which serves to advance the cable until a sufficient length has been installed in the duct for viscous drag forces to be effective in further installing the cable (typically the first third to half of the overall length of the installation duct). The drive wheels also enable the hydrostatic back pressure, which acts to urge the cable back out of the duct, to be overcome.

The rate of the advance of the cable depends inter alia upon the magnitude of the pushing force applied by the drive wheels, friction and the amount of viscous drag available (which depends upon the applied gas pressure, cable diameter, duct size and length and installed cable length). Typically the rate of installation in any given situation is controlled by the operator simply controlling the amount of pushing force applied by the motor. Because any given blowing head can typically be used with a range of cable diameters, it is common for the blowing head motor to be able to provide more pushing force than a relatively small cable can withstand without buckling. Normally the desire is to use the fastest possible installation rate while avoiding buckling and the motor control is adjusted to provide this. As those skilled in the art will understand, in practice a given cable will start to buckle under different conditions depending upon its free length, the pulling force provided by viscous drag, friction, duct diameter, duct geometry, etc. Thus, in practice the machine operator needs to stay with the blowing head in order to monitor the blowing process and to ensure that buckling is avoided, at least if a reasonable installation rate is to be achieved.

Cable buckling is avoided in order to prevent damage to both the cable and blowing head, especially the drive wheels. Buckling can cause the cable to jam in the duct and tends to cause delays in the installation process. Blowing heads may include motor stall sensors, clutches or frangible links operative to prevent damage to the motor or drive wheels (or tires). Even with heads having such features, the operator in practice still needs to monitor the blowing operation at the blowing head. A device, known as a buckle detector, for monitoring the onset of buckling and for controlling the blowing head drive to avoid buckling is described in EP-B-253636. It is known from GB-A-2 294 131 to integrate a buckle detector with a blowing head.

SUMMARY OF THE INVENTION

The present applicants, who are the proprietors of the above-mentioned European Patents, have now devised a new buckle detector which can be integrated with a blowing head to form a simple and compact device which improves overall blowing performance—even compared to the combined use of the blowing head of EP-B-108590 and the buckle detector of EP-A-345968. The new head design resulting from the integration of the new buckle detector is particularly suitable for use with the very compact optical fibre cables described in EP-A-521710 and EP-A-345968.

According to a first aspect of the invention there is provided a blowing head for a blown cable installation process, the blowing head comprising:

a cable inlet to receive a cable, a cable outlet for connection to a duct into which the cable will be installed, the cable inlet being connected to the cable outlet by a connecting channel, one or more drive wheels coupled to drive means, the drive means, in use, driving the one or more drive wheels to apply a longitudinal drive force to the cable, a cavity contiguous with the connecting channel, deflecting means, sensing means, control means, a gas inlet port and a gas injection point, the gas injection point being coupled to the gas inlet port and opening into the connecting channel at a point intermediate the cavity and the cable outlet;

said longitudinal drive force in use causing the cable to be advanced along the connecting channel, through the cavity, past the deflecting means and the gas injection point, and through the cable outlet into a duct connected thereto;

There is also provided a blown cable installation apparatus, comprising a blowing head as described above and control means responsive to the output of a sensor in the buckle detector and operative to control the motor in response to the output of the sensor.

According to a second aspect of the invention there is provided a blowing head for a cable installation process, the blowing head comprising: a cable inlet to receive a cable, a cable outlet for connection to a duct into which the cable will be installed, the cable inlet being connected to the cable outlet by a connecting channel, one or more drive wheels coupled to drive means which, in use, drives the one or more drive wheels to apply a longitudinal drive force to the cable, a cavity contiguous with the connecting channel, deflecting means, sensing means, control means, a gas inlet port and a gas injection point, the gas injection point being coupled to the gas inlet port and opening into the connecting channel at a point intermediate the cavity and the cable outlet; the longitudinal drive force causing the cable to be advanced along the connecting channel, through the cavity, the deflecting means and the gas injection point, and through the cable outlet into a duct connected thereto; the sensing means being configured to sense lateral deviation of the cable, said lateral deviation occurring when excessive longitudinal drive force causes the cable to buckle at the deflecting means; the control means being responsive to the sensing means to control the drive means to vary the driving force applied by the one or more drive wheels in accordance with the output of the sensing means. Preferably means are provided to detect the direction of movement of the transmission line such that if the transmission line moves in a reverse direction (from the usual installation direction) the control means direct the drive means to increase the driving force applied by the one or more drive wheels until the transmission line is held in equilibrium. Preferably only one of the drive wheels is coupled to the drive means. Preferably the sensing means comprise an optical source and an optical detector.

Preferably the source of high pressure gas is chosen to be compatible with the environment in which the installation will take place, although routinely an inert gas such as air or nitrogen will be used. A compressor or bottled gas may be used.

According to a further aspect of the invention there is provided a method of installing a cable into a duct, the method comprising the steps of:

i) coupling a blowing head according to the first or second aspects of the invention to the duct;

ii) introducing a cable into the blowing head and engaging the cable with the rotatable driving element or wheel of the head;

iii) applying pressurized gas to the duct;

iv) advancing the cable through the head and along the duct; and v) controlling the tractive force applied through the rotatable driving element or wheel in accordance with the output of a sensor or sensors of the blowing head.

According to a further aspect, the present invention provides a blowing head for a blown cable installation process, comprising: a motor and a rotatable driving element operatively connected to the motor; a cable inlet to receive a cable to be installed; a cable outlet for connection to an installation duct into which the cable is to be installed, the cable outlet being connected to the cable inlet by a through bore, the through bore defining a cable path along which the cable passes in use; a rotation sensor to sense the direction of movement of the rotatable driving element; and control means, operatively connected to the rotation sensor and to the motor. In use, the control means causes, in response to the detection of rotation of the driving means in the sense opposite to that which applies when the cable is being inserted into the duct, the motor to apply a holding torque to the driving element to counteract the opposite rotation.

In a yet further aspect, the present invention provides a buckle detector for a blown cable installation process for use downstream of the tractor element of a blowing head, the detector comprising: a cable inlet to receive a cable to be installed; a cable outlet for connection to an installation duct into which the cable is to be installed, the cable outlet being connected to the cable inlet by a through bore, the through bore defining a cable path along which the cable passes in use; a cavity, through which the cable path passes, a sensor or sensors being provided to monitor, in use, the position of the cable within the cavity. The buckle detector also includes a deflector on which the cable impinges on its passage along the cable path, the deflector being arranged to introduce a bend into the path followed by the cable. If the cable is propelled into the buckle detector with an excess of force the cable will preferentially buckle within the cavity at the site of the deflector.

BRIEF DESCRIPTION OF THE DRAWINGS

The invention will now be described, by way of example only, with reference to the following drawings in which:

FIG. 6 is a schematic depiction showing the arrangement of the encoder, the motor and the drive wheels in a blowing head according to the present invention;

FIG. 8 is a schematic depiction of the cross-section of the interior of a blowing head according to the second embodiment of the present invention;

FIG. 9 is a schematic perspective view of a blowing head according to the second embodiment of the present invention;

FIG. 12 is a representation of a blowing head according to the present invention; and FIG. 13 is a representation of a blowing head according to the present invention, with the blowing head opened to show interior details.

DETAILED DESCRIPTION OF EXEMPLARY EMBODIMENTS

Figure 1:
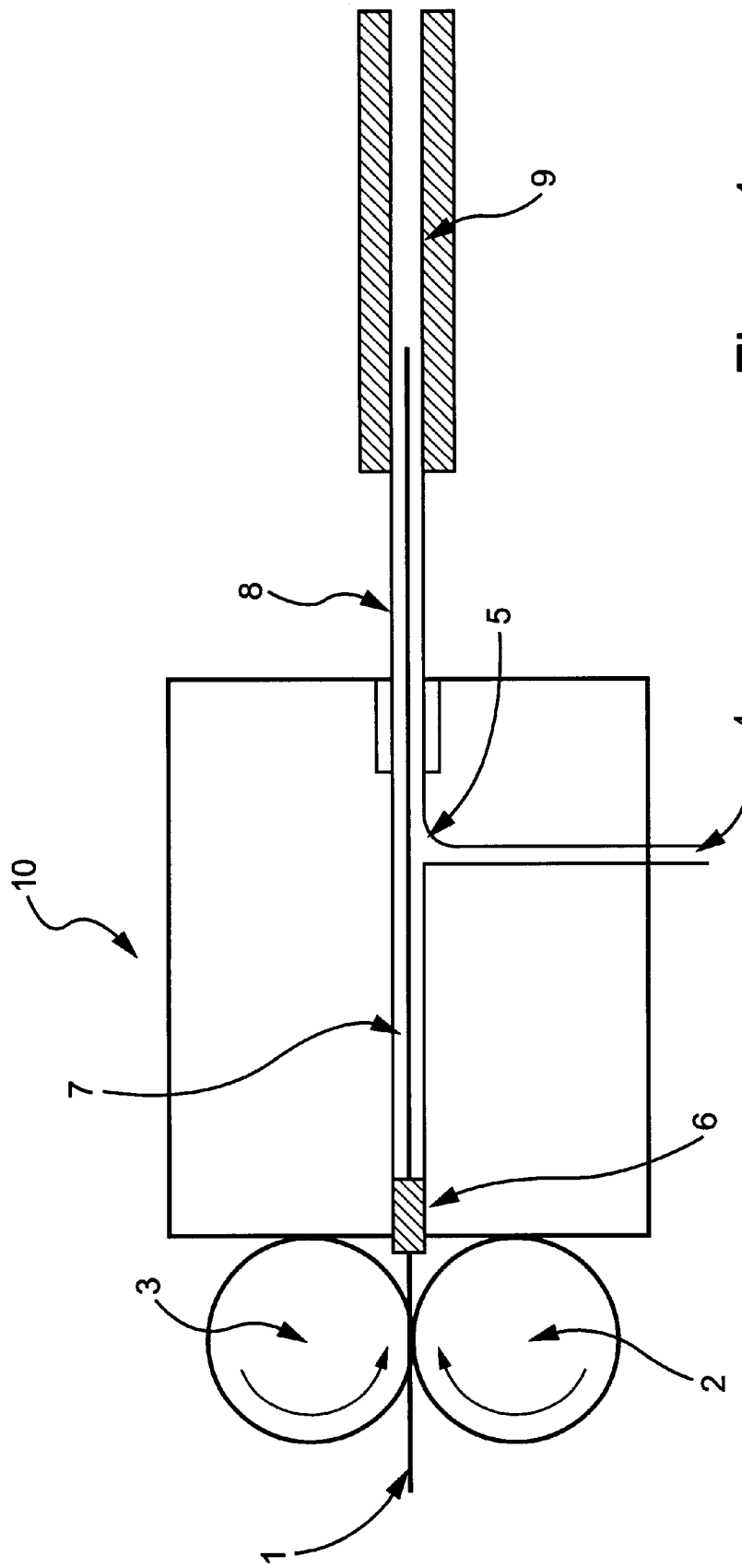
FIG. 1 is a schematic depiction of a blowing head according to the prior art.

FIG. 1 shows a schematic depiction of the prior art installation apparatus 10 used to install transmission lines into pre-installed ducts. The transmission line 1 is driven by a pair of drive wheels 2 and 3. The installation apparatus, or blowing head 10, also comprises an inlet 4 for the connection of a supply of a high-pressure (typically 3 to 10 bar) gaseous medium. The high-pressure gaseous medium enters the passageway 7 at an injection point 5, developing a high-pressure region within the blowing head 10. The drive force applied by the drive wheels advances the transmission line through a seal 6 and into the passageway 7, overcoming the hydrostatic potential due to the difference in pressure between the high-pressure region within the blowing head and duct and the pressure (typically atmospheric) outside the blowing head. The drive force further propels the transmission line along the passageway, through tube 8 and into the pre-installed duct 9. The injection of the gaseous medium causes a high speed airflow along duct 9 and the combination of the drag force caused by the high speed airflow and the drive force applied by the wheels propels the transmission line along the length of the pre-installed duct.

Figure 2:
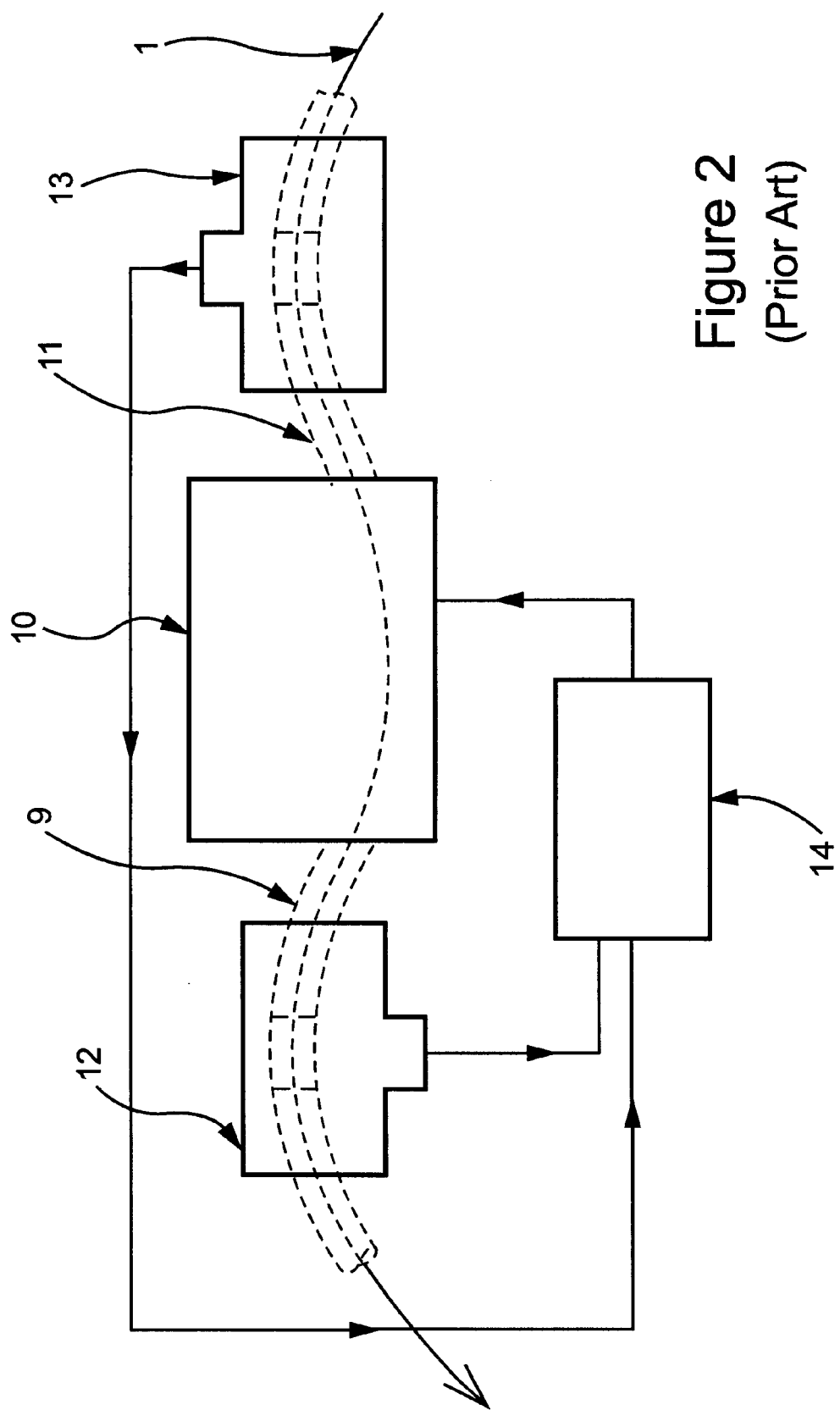
FIG. 2 is a schematic depiction of the control apparatus according to the prior art.

FIG. 2 shows a schematic depiction of the prior art control apparatus 12 and 13 being in used in conjunction with a blowing head 10. The control apparatus, or buckle detectors, 12 and 13 are both connected to a control unit 14, which is in turn connected to control means associated with the blowing head 10 (not shown). A continuous length of duct 9, which is the beginning of the installation duct passes through buckle detector 12, which imparts a curve onto the trajectory of duct 9. Similarly the length of duct 11, which carries the transmission line 2 into the blowing head 10, passes through buckle detector 13. Buckle detector 12 is configured to detect excessive longitudinal compressive forces in the transmission line while buckle detector 13 is configured to detect excessive longitudinal tensile forces in the transmission line. When either of the buckle detectors 12, 13 detects excessive forces in the transmission line 1 the relevant detector outputs a signal to the control unit 14, which in turn sends a signal to the control means within the blowing head to vary accordingly the drive force applied to the transmission line.

Figure 3:
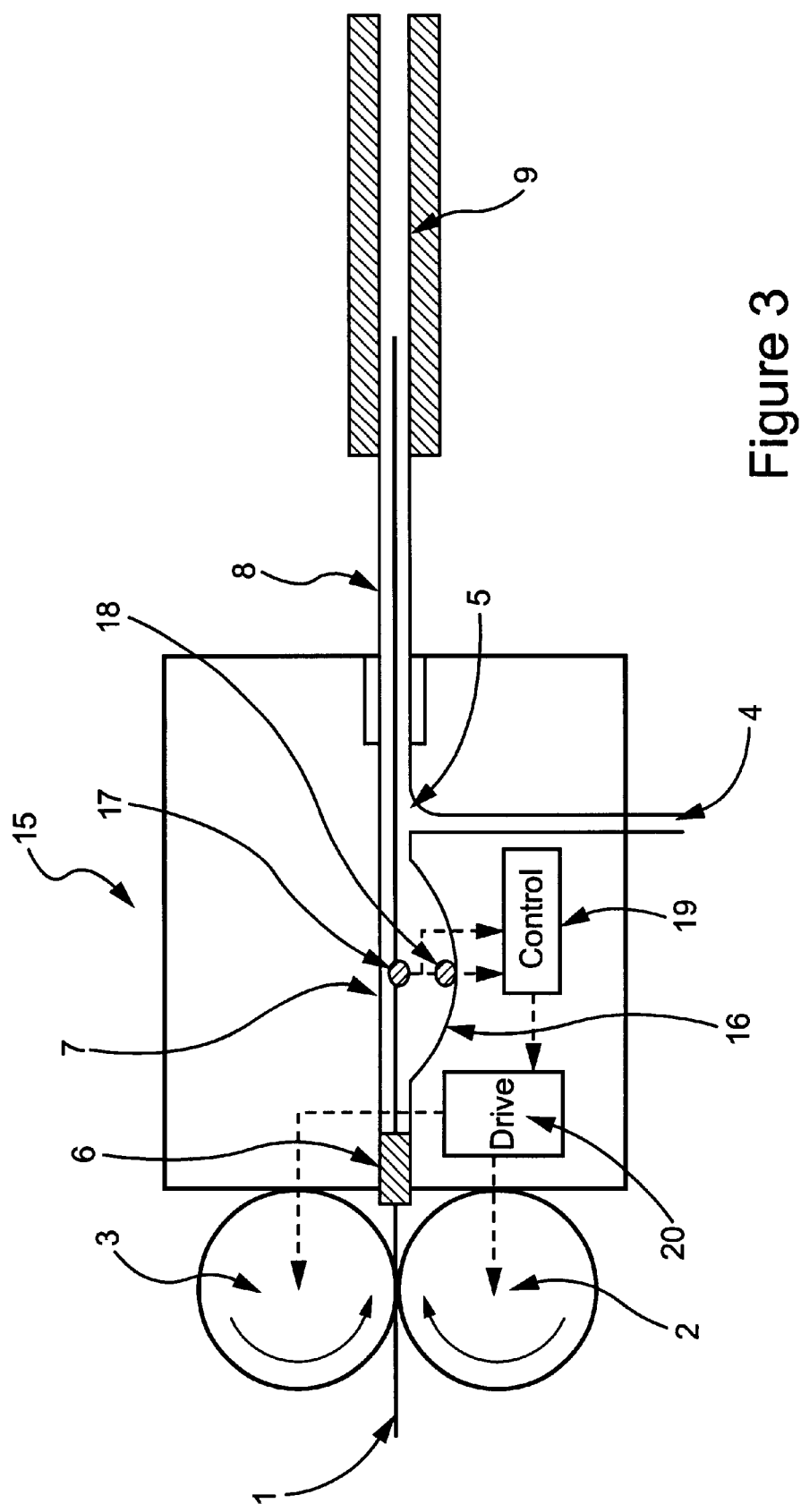
FIG. 3 is a schematic depiction of a blowing head according to a first embodiment of the present invention.

FIG. 3 shows a schematic depiction of a first embodiment of the present invention. Blowing head 15 has many features common to the blowing head of the prior art such as the drive wheels 2 and 3, which drive the transmission line 1 through the seal 6 and along the passageway 7. The passageway 7 is, in use, at a pressure greater than the external pressure due to the supply of a high-pressure gaseous medium to the inlet 4, the high-pressure gas being introduced into the passageway 7 at the injection point 5. The outlet of the blowing head 15 is connected, via tube 8, to pre-installed duct 9 along which the transmission line 1 is propelled by the combination of the drive forces applied by the drive wheels 2 and 3 and the drag forces caused by the high-speed flow of the gaseous medium. Additionally there is a cavity 16 which adjoins the passageway intermediate the seal 6 and the gas injection point 5. The cavity 16 extends the cross-section of the passageway throughout the length of the cavity 16. Optical sensors, here two in number, 17 and 18 are situated in the walls of the cavity 16. The body of the blowing head can be made from any material which can be suitably formed to manufacture the blowing head 15 and resist the increased pressure that occurs within the blowing head. Preferably the material used to make the blowing head 15 is a metal such as an aluminium alloy or stainless steel, although an engineering plastic such as glass-reinforced nylon or an epoxy resin can be used. The seal 6 is preferably annular with the aperture dimensioned so as to accept a transmission line while minimizing the leakage of gas through the seal 6 from the blowing head 15 and minimizing the friction between the seal 6 and the transmission line. The seal 6 can be made from a polymeric or metallic material, but metallic seals are preferred as they have a longer operating lifetime. FIG. 3 shows a control circuit 19 and a drive 20 means as being located within the body of the blowing head 15. It will be understood that either, or both, of the control circuit 19 or the drive means 20 may be located in a separate unit which can be sited remotely from the blowing head 15 when the head is in operation. It is possible, and generally preferable, to connect the blowing head 15 directly to the duct 9 without an intermediate tube.

Figure 4:
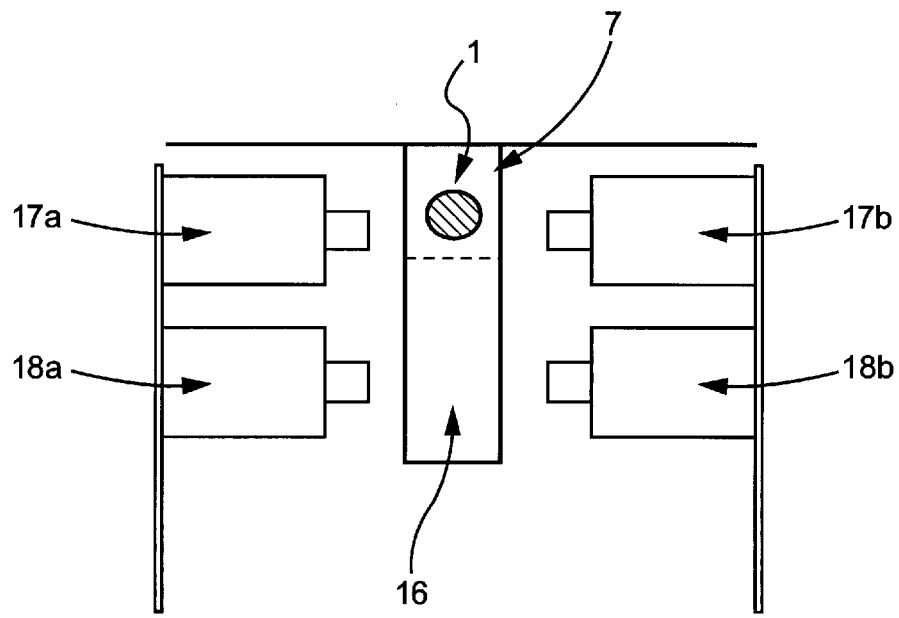
FIG. 4 is a schematic depiction of the cross-section of the interior of a blowing head according to the first embodiment of the present invention.

FIG. 4 shows a schematic depiction of the cross-section of the interior of the blowing head 15, with each sensor 17 and 18 comprising an optical source, respectively 17a and 18a, and an optical receiver, respectively 17b and 18b, which are in direct alignment and placed on opposite sides of the cavity, on an axis which is perpendicular to the axis of the cavity. The term "optical" includes light from the visible spectrum as well as infra-red radiation in the wavelength bands commonly associated with optical fibre communications systems.

It will be readily understood that optical sensors 17,18 are not the only type of sensors that could be used. Mechanical contact switches could be used to give either an indication of the position of the transmission line 1 or the buckling force that was acting on the transmission line 1. If the transmission line 1 contains metallic members then it would be possible to use non-optical electrical sensors which could measure variations in inductance or capacitance.

The optical receivers of sensors 17 and 18 are connected to a control circuit 19, which is in turn connected to the drive means 20 which is coupled to one of the drive wheels 2 and 3. The uppermost sensor 17, that is the sensor closest to the axis of the passageway, is placed such that when in a normal state of operation the transmission line triggers the upper sensor 17 by interrupting the beam of light transmitted from optical source 17a to optical receiver 17b. It is generally unimportant whether the interruption is complete, i.e. the transmission line completely obscures the source or detector, or partially as long as there is a measurable change in the output of the detector between the presence and the absence of the transmission line 1.

If a transmission line 1 were to be introduced into the blowing head 15 and the interior of the blowing head 15 was already pressurized, then the pressure differential between the inside and the outside of the blowing head 15 would cause a piston force to be applied to the transmission line 1, tending to expel the transmission line 1 from the blowing head 15. To prevent this from occurring, when sensor 17 initially detects the presence of a transmission line 1 it causes a holding torque to be applied to the transmission line 1, of a sufficient magnitude to overcome the piston force and maintain the position of the transmission line 1. This feature of the head 15, which does not appear to have been used before, clearly has application to blowing heads of all types, whether or not they also include a buckle detector. When the installation is to begin the torque applied to the transmission line 1 is increased so that the drive wheels 2, 3 drive the transmission line 1 into the duct 9. The maximum installation speed is governed by a potentiometer which is located on the blowing head 15, in such a position so as to allow the operator to manually adjust the maximum installation speed of the transmission line 1. When an installation is started, the control circuit 19 instructs the drive means 20 to increase linearly the installation speed from zero to the maximum installation speed in six seconds. Under normal operating conditions the cable occupies the central position of the passageway, at least partially obscuring the sensor 17 and this gives rise to a green indicator (e.g. an LED) being illuminated to inform the operator that the installation is proceeding in a proper manner.

When the drive force applied by the drive wheels 2, 3 is greater than the force due to the drag of the high-speed airstream which is "seen" at the blowing head 15, compressive forces occur in the cable at the blowing head. The cable is a slender column and will begin to buckle when sufficient compressive force acts upon it. The passageway constrains the lateral movement of the cable, but the portion of the cable that is within the region of the passageway that adjoins the cavity 16 is free to move laterally into or further into the cavity 16. However, when sufficient longitudinal compressive forces act on the cable, the cable in the region of the cavity will buckle. If the buckle in the cable causes the cable to move laterally such that it ceases to trigger the upper sensor 17, then the optical receiver 17b will detect the radiation emitted by optical source 17a unimpeded by the cable. The control circuit 19 receives the change in signal from sensor 17 and sends a signal to the drive means 20 to reduce the driving force applied by the drive wheels 2, 3. This situation causes an amber indicator LED to be illuminated to inform the operator that a minor problem has occurred.

This decrease in drive force will reduce the compressive forces in the cable and hence reduce the slight buckle in the cable, causing the cable to tend to return to its typical position and to re-trigger the upper sensor. The control circuit 19 will then try to increase the installation speed from its reduced level back to the maximum level, increasing the speed linearly over a period of 6 seconds. Situations may arise where the cable "hunts" in between the "green" and "amber" states and in this case the blowing head operator should use the potentiometer on the blowing head 15 to reduce the set maximum installation speed of the cable. The feedback loop that minimizes the amount of buckle in the cable is sufficiently responsive so that the amount of time that the cable is in the "amber" state is minimized. Circumstances which might cause the cable to enter the "amber" state are the cable traversing a bend in the route of the duct or when the cable is near to the end of the duct route.

If the transmission line 1 were to come to a stop, for some reason such as, for example, a duct blockage or a bend of very small radii in the duct, then there is a significant possibility that the drive force would cause the transmission line 1 to buckle so much that mechanical damage would occur, with the possibility of snapping the transmission line 1. In order to prevent this possible failure, if the buckled transmission line 1 triggers lower sensor 18, the control circuit 19 causes the drive means 20 to stop the drive wheels 2 instantly so that the problem with the installation can be rectified. The position of the lower sensor 18 is chosen such that, in general, the transmission line 1 can buckle sufficiently to trigger the sensor 18 without experiencing significant mechanical damage. This situation causes a red indicator LED to be illuminated to inform the operator that a serious problem has occurred. If this "red" state is entered the blowing head 15 can only be re-started by returning to the "green" state and increasing the installation speed from zero. The installation speed will then be increased linearly from zero to the maximum value over a period of six seconds.

Figure 5:
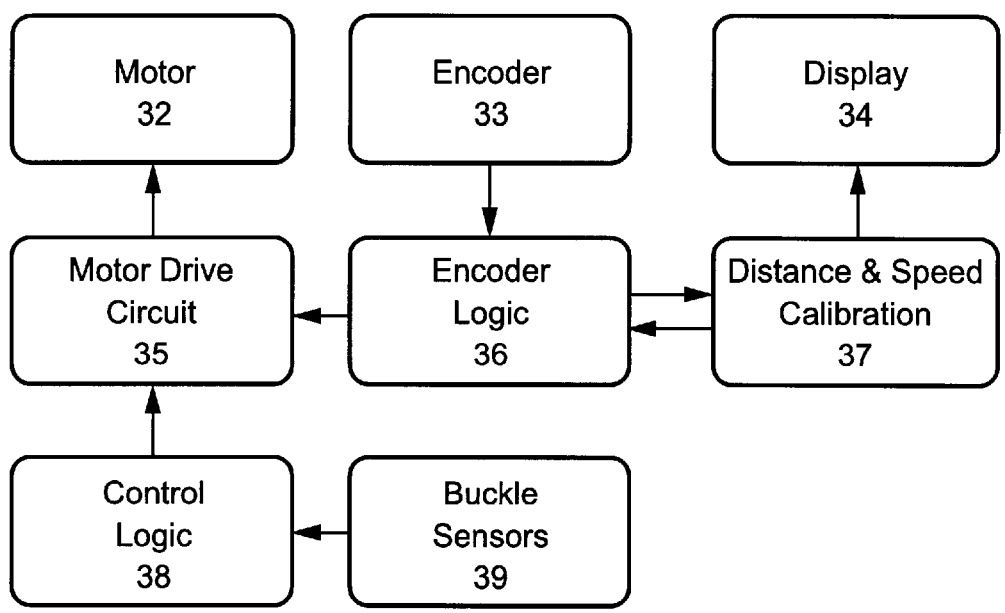
FIG. 5 is a block diagram showing the main elements of the electronic subsystems that control a blowing head according to the present invention.

FIG. 5 shows a block diagram which indicates the main elements of the electronic sub-systems that control the blowing head 15. The control logic 38 receives information from the buckle sensors 39 regarding the position of the cable within the blowing head, i.e. whether the cable is in the "green", "amber" or "red" states. Depending upon the information received from the buckle sensors the control logic instructs the motor drive circuit 35 to maintain, increase or decrease the speed of the motor 32, which in turn impels the drive wheels. The motor drive circuit 35 applies a drive voltage to the motor 32 and the speed of the motor 32 is proportional to the drive voltage applied by the motor drive circuit 35. The maximum drive voltage is governed by a potentiometer, the setting of which can be altered by the operator of the blowing head 15 to control the installation speed in order to suit the characteristics of the route into which the cable is being installed. The encoder 33 is physically coupled to the motor 32 (see FIG. 6) to enable the speed and direction of the motor 32 to be monitored. The encoder 33 is a conventional two channel optical device, comprising two out-of-phase line sets carried on a disc 40 and an encoder detector 41. From the relative position of the rising and falling edges generated by the two line sets, the direction of motion of the motor 32, and thus the drive wheels 2, 3 can be ascertained. If the motor 32 begins to move in a reverse direction (relative to the direction of the cable when being installed) then the encoder logic 36 instructs the motor drive circuit 35 to apply a holding torque, in order to hold the cable within the body of the blowing head 15 and prevent it from being expelled out by the piston force caused by the pressure differential.

The encoder disc 40 generates 500 pulses per revolution for each of the two channels. The disc 40 is physically coupled to motor 32 (see FIG. 6) which is connected to the drive wheels 2 and 3 via gearing 42. The gearing has a ratio of 5:1 so that a single revolution of the drive wheels requires 5 revolutions of the motor and thus generates 2500 pulses in each encoder channel. The tires of the drive wheels 2, 3 have a circumference of approximately 100 mm and thus 25,000 pulses are generated by installing the cable a distance of 1 meter. This allows the position of the cable to be accurately monitored as each encoder pulse represents a cable displacement of 40 $\mu$m. As indicated above, this aspect of the new head has application to heads which are used without buckle detectors and it is believed to be independently inventive.

FIG. 6 shows the motor being coupled to both of drive wheels 2 and 3. It should be understood that the motor 32 could be coupled to only one of either drive wheels 2 or 3.

The above discussion has referred to drive wheels 2, 3 but it will be apparent to the skilled person that the drive wheel (or wheels) could be changed for an equivalent device such as, for example a drive belt or a caterpillar drive.

Referring to FIG. 5, information regarding the installation distance and speed are fed from the encoder logic 36 to the distance and speed calibration circuit 37. The installed distance is displayed to the operator using display 34, which preferably comprises an LCD display unit but may comprise any suitable display 34 (e.g.an L.E.D. or electromechanical device). The display unit also displays the nominal installation speed of the cable, which is derived from the position of the potentiometer that governs the motor drive current. If there is a difference between the installation speed as derived from the potentiometer and the installation speed as calculated by the encoder logic from the output of the encoder 33, then a calibration signal is sent to the encoder logic which causes a further signal to be sent to the motor drive circuit, activating a servomechanism that causes the motor drive voltage to be suitably increased. This feedback loop ensures that the actual installation speed of the cable is the same as the nominal installation speed that is indicated by the display in accordance with the positioning of the potentiometer by the operator of the blowing head. Such a discrepancy may arise due to temperature-dependent variations in the rolling resistance of the tires.

Figure 7:
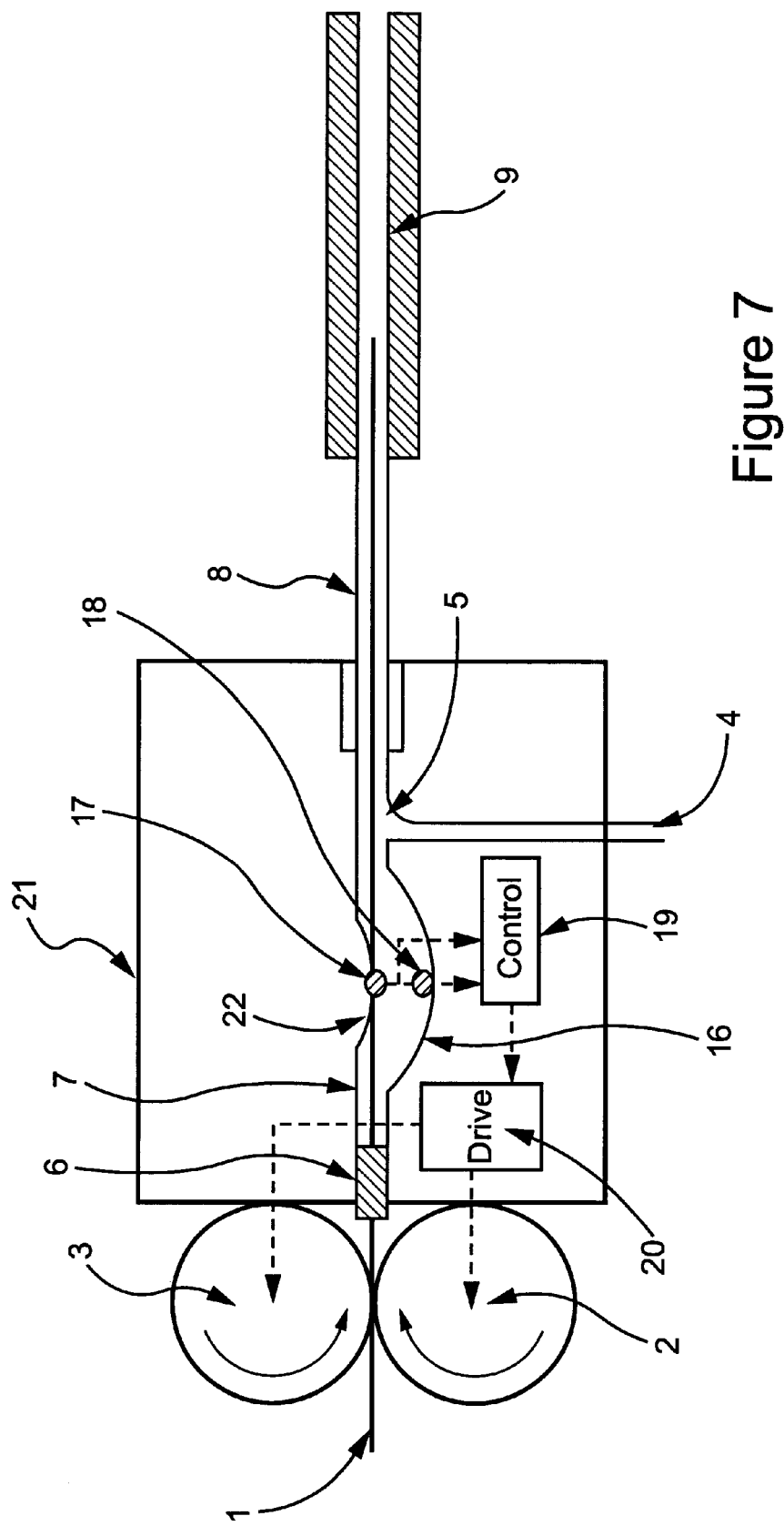
FIG. 7 is a schematic depiction of a blowing head according to a second embodiment of the present invention.

FIG. 7 shows a schematic depiction of a second embodiment of the present invention and FIG. 8 shows a schematic depiction of the cross-section of the interior of the second embodiment of the present invention. Blowing head 21 is structurally similar to blowing head 15 (as shown in FIG. 3) except for the addition of deflector 22. The deflector is slightly curved and in this particular embodiment it is a plate. The deflector 22 is positioned parallel to the axis of and slightly protruding into the bore of passageway 7. When the blowing head 21 is operating in its normal state, the transmission line 1 passes over the deflector 22, triggering the upper sensor 17 which causes the drive force to be maintained at its maximum permissible level. When excess compressive forces act upon the transmission line the blowing head 21 operates in an identical manner to the apparatus of the first embodiment, as described above and depicted in FIGS. 3 and 4. The addition of the deflector 22 causes the transmission line 1 to buckle in a more controlled manner and reduces the possibility of the transmission line being damaged by excessive compressive forces.

A blowing head as described above, sized appropriately, could be used in the installation of cables with diameters ranging from 1 to 20 mm. In order to maximise the utilization of network infrastructure there is considerable interest in installing very small cables, i.e. 1 mm diameter, into microducts with an internal bore of, say, 3.5 mm. Such small cables are described in European Patent Applications EP-A-345968 and EP-A-521710. Typically, such cables contain from 1 to 8 optical fibres, usually single mode, sometimes multimode, housed in a common polymeric sheath. Because of their size and structure, these cables have little resistance to buckling and would benefit greatly from the use of a blowing head according to the present invention. The following discussion assumes the use of such a cable with a nominal diameter of 1 mm. The underlying principles hold true for cables with larger diameters, but the embodiments described in the following discussion would need to be scaled suitably to account for differences in cable diameter, stiffness, etc.

Figure 10:
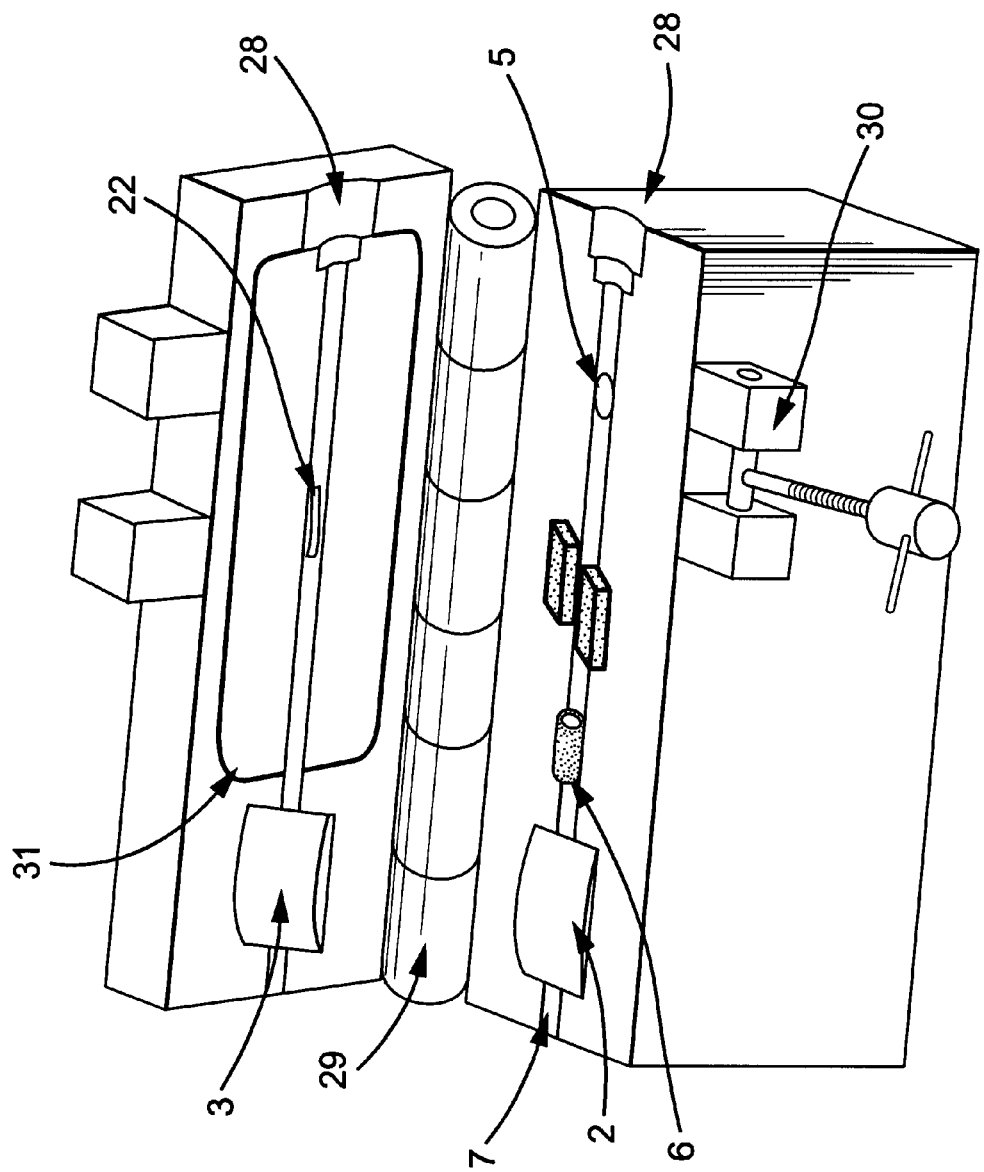
FIG. 10 is a schematic depiction of an experimental method for determining the resistance of a transmission line to compressive forces.
Figure 11:
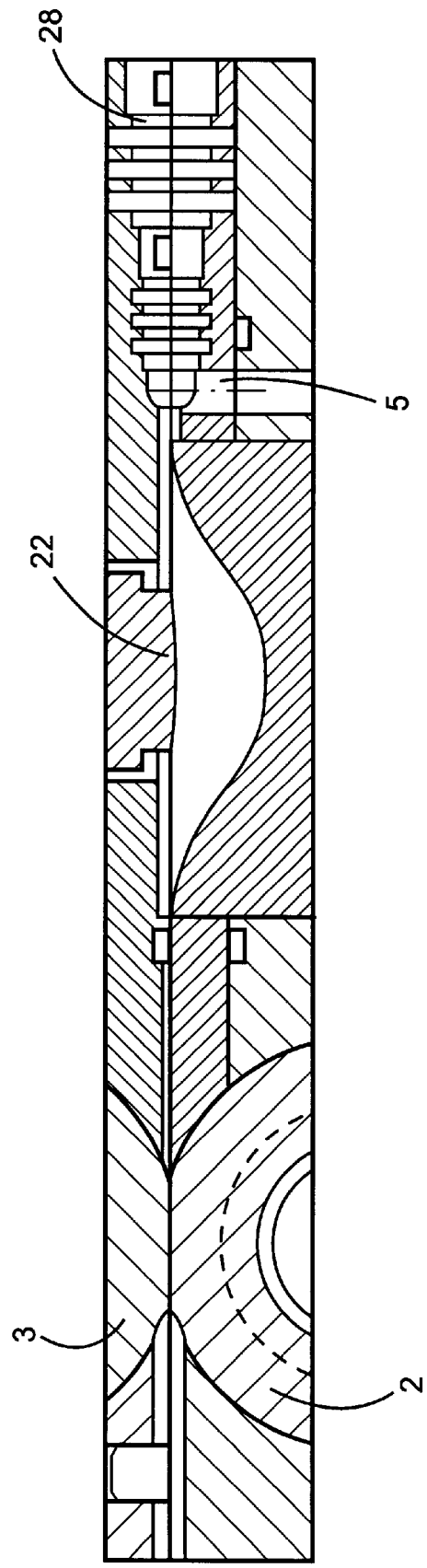
FIG. 11 is a schematic partial cross-section through the blowing head according to the second embodiment of the present invention.

FIG. 10 shows a schematic perspective representation of a blowing head 21 according to the second embodiment of the invention. The two halves of the blowing head 21 are connected by hinge 29 and can be fastened shut using clamp 30. It is understood that any other method of effecting a seal by fastening the two halves of the blowing head 21 together may be used, but the use of an integral hinge has the advantage of reducing the numbers of fasteners needed for a secure fixing of the upper and lower parts of the head, reducing the time involved in opening and closing the head. Also, the hinged arrangement lessens the likelihood of damage to seal 31 or the lower face of the upper half of the head. Seals 6 and 31 prevent the high-pressure gas escaping from the blowing head. Outlet 28 enables ducts of two different sizes to be sealingly clamped to the blowing head 21. Typically, circumferential grooves in the form of teeth are provided to facilitate the retention of the duct within the head are provided. Those skilled in the art will readily understand that the head can be designed to receive only one tube size, or more than two tube sizes. It will be also understood that the tubes may be attached to the blowing head using a connector or any other means that effects an efficient seal.

FIG. 9 shows a schematic depiction of an experimental method for determining the resistance of a transmission line 1 to compressive forces. Samples of transmission line 1 were placed in experimental apparatus 26 and 27 which recreate the dimensions and geometry of the interior of blowing heads 15 and 21, FIGS. 7a and 7b respectively. Load cell 23 places an axial compressive force, which increases with time, on the end of the sample of transmission line 1 and transmits the magnitude of the compressive force to the data logger 25. As the compressive force increases the transmission line 1 will start to buckle subject to the constraints of the cavity and the passageway and will cease to trigger sensor 17. Control unit 24 sends an output signal to data logger 25 and the compressive force at which buckling started is stored in the memory of the data logger. The compressive force will continue to increase, further increasing the buckling on the transmission line 1. When the transmission line reaches the point of maximum buckle it will trigger lower sensor 18, which causes the control unit to send a signal to the data logger. The data logger will record the compressive force at which maximum buckling occurred.

Experimental apparatus 27 is similar to experimental apparatus 26, except that it additionally comprises a deflector 22 which has the same size and dimensions as the deflector used in blowing head 21. The deflector also has the same position relative to the cavity as the deflector in blowing head 21. The compressive forces required to start buckling and for maximum buckle are similarly recorder by the data logger 25.

Table 1 shows a number of experimental results obtained using the experimental method described above with the apparatus shown in FIG. 8a. The † symbol denotes that the compressive forces were sufficient to break the transmission line.

TABLE 1

| Sample Number | Force Required to Start Buckling (grams force) | Force Required for Maximum Buckle (grams force) |
| --- | --- | --- |
| 1 | 38 | 58 |
| 2 | 88† | 88† |
| 3 | 104† | 104† |
| 4 | 88† | 88† |
| 5 | 48 | 58 |
| 6 | 35 | 64 |
| 7 | 42 | 64 |
| 8 | 41 | 64 |
| 9 | 35 | 56 |
| 10 | 98† | 98† |

Table 2 summarizes a number of experimental results obtained using the experimental method described above with the apparatus shown in FIG. 8b, i.e. including the deflector.

TABLE 2

| Sample Number | Force Required to Start Buckling (grams force) | Force Required for Maximum Buckle (grams force) |
| --- | --- | --- |
| 1 | 45 | 68 |
| 2 | 45 | 64 |
| 3 | 46 | 67 |
| 4 | 43 | 64 |
| 5 | 46 | 65 |
| 6 | 38 | 60 |
| 7 | 38 | 58 |
| 8 | 42 | 65 |
| 9 | 44 | 67 |
| 10 | 43 | 68 |

A comparison of Table 1 and Table 2 shows that the inclusion of the deflector significantly improves the repeatability of the experiment, making both the force at which buckling starts and the force that causes maximum buckling more consistent. The deflector also prevents the build-up of higher forces that lead to very rapid buckling and fracture of the transmission line.

It will be recognized that the function of the deflector 22 is to cause buckling to occur before the cable suffers physical damage and that this function is more significant than the structure of the deflector 22. Preferably the deflector is curved. If the deflector 22 is not curved then any edges which may come into contact with the cable should be chamfered, so that the likelihood of the deflector abrading the cable is minimized. The deflector 22 and its surroundings should be designed so that if the cable buckles within the head it does so into the cavity at the site of the deflector Conveniently, the deflector's curve may describe an arc of a circle. The deflector 22 could alternatively have a parabolic curve or a non-curved structure. Any non-curved deflector 22 would have to be designed such that the passage of the cable over the deflector 22 does not lead to damage to the outer surface of the cable.

FIG. 12 shows a representation of a blowing head according to the invention with the two halves of the blowing head being sealed by clamp 30. Housing 31 contains the motor and gearing and housing 32 contains the encoder. FIG. 13 shows a representation of a blowing head according to the invention with the blowing head opened to show interior details.

The deflector is provided in order to provide the advantageous effects of
  (i) a more repeatable threshold for the onset of buckling and (ii) a reduced maximum buckle force which reduces the possibility of damaging the transmission line. As indicated above, the exact shape of the deflector is not critical and the deflector may have, for example, either a circular or a parabolic curve. It has been found that for a cable having a diameter of 0.9 to 1.2 mm and for a deflector having a curve of part circular profile it is preferable that the deflector protrudes 0.5 mm to 1.5 mm into the passageway and has a radius of 10–50 mm. More preferably, for this cable size, the deflector protrudes 1 mm, or thereabouts, into the passageway and the radius of the deflector's curve may be 30 mm or thereabouts. In order to make allowance for the tolerances attainable with mass production techniques it is preferred that the deflector is connected to adjusting means to allow for the protrusion of the deflector to be calibrated (typically before it is dispatched to the field and periodically thereafter). This will also enable the blowing head to be used with cables with a range of diameters.

For a cable with a diameter of approximately 1 mm it has been found that the passageway 7 preferably has a diameter of 1.5–3 mm. More preferably the passageway is 2 mm in diameter. The upper limit to the size of the passageway is governed by the size of the duct into which the cable is to be installed. In general the diameter of the passageway should be less than the diameter of the duct. A typical duct diameter for a 1 mm cable is 3.5 mm. The relationship between cable diameter and duct diameter for successful blowing installations is well known from EP-B-108590. It is preferred that the ratio of cable diameter to duct bore is within the range 1:3 to 1:2. Installation of cables into ducts which lie outside of this range is not impossible but is much less efficient. The size of the cavity into which the cable will deviate also depends upon the diameter of the cable. In general the depth of the cavity should be at least four times the cable diameter and the cavity length should be at least eight times the cable diameter. In order to prevent cables being subjected to too small a bend radius it is preferred that the cavity is at least twice as long as it is deep. For a cable with a 1 mm diameter a preferred range of cavity depths is 6–10 mm and a preferred range of cavity lengths is 20–30 mm. Highly satisfactory results have been achieved with a cavity depth of 8 mm and a cavity length of 26 mm. It is preferred that the cavity has a convex curved shape in order to prevent cables being subjected to too small a bend radius. An alternative cavity shape would be a substantially rectangular shape but with chamfered corners to prevent damage occurring to the cable.

The drive means 20 which are used to propel the transmission line along the duct normally comprise an electric motor, typically low voltage ($\leq 50V$) to provide the drive force, however it will be understood that other forms of motor e.g. hydraulic or pneumatic motors may also be used. Pneumatic motors in particular are preferred alternatives to electric motors although an appropriate control transducer needs to be provided to enable the electrical output of the controller 19 to control the motor's drive force. Additionally, rather than coupling both of the drive wheels 2, 3 to the drive means 20 it is possible, and preferable, to provide the drive force through only one of the drive wheels. This avoids problems, which can arise with two drive wheels—if they are not sychronized, of different drive forces being provided by the different drive wheels—which can lead to serious cable damage. It should also be understood that in the embodiments discussed above, the speed of the motor is governed by the dc voltage fed to it. Alternatively the motor could be pulse width modulated, with the duty cycle of the pulses being varied in order to govern the speed of the motor.

Even though the rate of the installation process is automatically controlled by the control means it is beneficial to supply information to the operator of the blowing head using some form of display, for example illuminating a green light to indicate a normal operating state (referred to above as the "green" state), an amber light to indicate that buckling is occurring and that the drive force is being reduced (referred to above as the "amber" state) and a red light to indicate that maximum, buckling has occurred and that the drive force has been removed (referred to above as the "red" state). This display may be mounted on a surface of the blowing head and/or on a separate unit which can be sited remotely from the unit when the head is in operation. Additionally or alternatively audible signals may be provided to indicate state changes or non-green states. Additionally a manual override on the control circuit may be provided so that the installation is only re-started once the blockage that caused the "red" blockage to occur has been removed.

Although in the above described embodiments the cavity 16 has been shown and described as extending "down" into the lower block, it could of course extend "horizontally" or laterally. An advantage of the "vertical" arrangement is that no part of the optical sensor arrangement (which as either detector or source needs an electrical connection) needs to be in the upper position of the head. It would be possible to keep "all" the cavity and the sensors as part of the lower half of the head, even with a head which split generally along the axis of the bore along which the cable is guided and this would be preferable to arrangements in which an active part of the sensors were part of the upper half of the head.

Either in combination with a "horizontal" cavity as just proposed or with a "vertical" cavity, the optical source and optical detector for a sensor could be mounted side-by-side with an appropriately positioned reflector serving to guide the light from the source to the detector. In a "horizontal" cavity arrangement the reflector (e.g. mirror or polished surface) would be best be provided on the upper half of the head.

The drive wheels 2, 3 do not need to be mounted as an integral part of the block which forms the rest of the head, but too large a gap should be avoided so as to minimize the possibility of the cable buckling in the gap between the wheel housing and the rest of the head. (Obviously the size of gap that is acceptable will depend upon the ease with which the cable used will buckle and this will in general be related to the diameter of the cable.) The drive wheels are typically provided with rubber tires, and these will typically need periodic replacement. At least for the small diameter cables, the tires are formed from a suitable polymer or rubber material, for example Welvic PVC, which has a density of 1170 kg m$^{-3}$ and a softness of 115 (measured using British Standard BS 2782 Method 365A). An alternative material is GA8718, which has a density of 1320 kg m$^{-3}$, a softness of 86 (measured using British Standard BS 2782 Method 365A) and a Shore hardness of 57 (measured using British Standard BS 2782 Method 365B). The tires have a diameter of approximately 30 mm and in use are compressed by approximately 1 to 2 mm. Mounting the wheels outside the pressurized zone of the head, as in the illustrated embodiments has the advantage that the seals around this zone do not need to be disturbed when the tires and/or wheels are replaced. The wheels can, however, be mounted in the pressurized zone if this is preferred but it has been found to be non-optimum. The seals around the pressurized zone are preferably formed of silicone rubber or the like.

What is claimed is:

1. A blowing head for a blown cable installation process, comprising:
   a motor;
   a rotatable driving element operatively connected to the motor;
   a cable inlet to receive a cable to be installed;
   a cable outlet for connection to an installation duct into which the cable is to be installed, the cable outlet being connected to the cable inlet by a through-bore that defines a cable path along which the cable passes in use;
   a buckle detector located between the driving element and the cable outlet, said buckle detector comprising:
      a cavity, through which the cable path passes, within the blowing head;
      at least one sensor for monitoring, in use, the position of the cable within the cavity; and
      a deflector on which the cable impinges on its passage along the cable path, the deflector being arranged to introduce a bend into the path followed by the cable;
   wherein if the driving element propels the cable with an excess amount of force, the cable will preferentially buckle into the cavity at the site of the deflector.

2. A blowing head for a blown cable installation process, comprising:
   a motor;
   a rotatable driving element operatively connected to the motor;
   a cable inlet to receive a cable to be installed;
   a cable outlet for connection to an installation duct into which the cable is to be installed, the cable outlet being connected to the cable inlet by a through-bore that defines a cable path along which the cable passes in use;
   a buckle detector located between the driving element and the cable outlet, said buckle detector comprising:
      a cavity, through which the cable path passes, within the blowing head;
      at least one sensor for monitoring, in use, the position of the cable within the cavity; and
      a deflector on which the cable impinges on its passage along the cable path, the deflector being arranged to introduce a bend into the path followed by the cable;
   wherein if the driving element propels the cable with an excess amount of force, the cable will preferentially buckle into the cavity at the site of the deflector; and
   the deflector has a convex curved surface exposed to the cable path.

3. A blown cable installation apparatus, comprising a blowing head as claimed in claim 1, and a controller responsive to the output of said at least one sensor in the buckle detector and operative to control the motor in response to the output of the sensor.

4. A blowing head for a cable installation process, the blowing head comprising:
   a cable inlet to receive a cable;
   a cable outlet for connection to a duct into which the cable will be installed, the cable outlet being connected to the cable inlet by a connecting channel;
   a driver;
   at least one drive wheel coupled to said driver which, in use, drives the at least one drive wheel to apply a longitudinal drive force to the cable,
   a cavity contiguous with a channel, a deflector, a sensor, a controller, a gas inlet port and a gas injection point, the gas injection point being coupled to the gas inlet port and opening into the channel at a point between the cavity and the cable outlet;
   wherein said longitudinal drive force in use causes the cable to be advanced along the channel, through the cavity, past the deflector and the gas injection point, and through the cable outlet into a duct connected thereto;
   the sensor senses lateral deviation of the cable, said lateral deviation occurring when excessive longitudinal drive force causes the cable to buckle at the deflector;
   the controller is responsive to the sensor to control the driver to vary the driving force applied by the at least one drive wheel in accordance with the output of the sensor.

5. A blowing head as claimed in claim 4, wherein the deflector is curved.

6. A blowing head for a cable installation process, the blowing head comprising:
   a cable inlet to receive a cable;
   a cable outlet for connection to a duct into which the cable will be installed, the cable outlet being connected to the cable inlet by a connecting channel;
   a driver;
   at least one drive wheel coupled to said driver which, in use, drives the at least one drive wheel to apply a longitudinal drive force to the cable,
   a cavity contiguous with a channel, a deflector, a sensor, a controller, a gas inlet port and a gas injection point, the gas injection point being coupled to the gas inlet port and opening into the channel at a point between the cavity and the cable outlet;
   wherein said longitudinal drive force in use causes the cable to be advanced along the channel, through the cavity, past the deflector and the gas injection point, and through the cable outlet into a duct connected thereto;
   the sensor senses lateral deviation of the cable, said lateral deviation occurring when excessive longitudinal drive force causes the cable to buckle at the deflector;
   the controller is responsive to the sensor to control the driver to vary the driving force applied by the at least one drive wheel in accordance with the output of the sensor;
   the deflector is curved; and
   the curved deflector has a circular curvature with a radius of curvature which is not less than 10 mm but not greater than 50 mm.

7. A blowing head for a cable installation process, the blowing head comprising:
   a cable inlet to receive a cable;
   a cable outlet for connection to a duct into which the cable will be installed, the cable outlet being connected to the cable inlet by a connecting channel;
   a driver;
   at least one drive wheel coupled to said driver which, in use, drives the at least one drive wheel to apply a longitudinal drive force to the cable,
   a cavity contiguous with a channel, a deflector, a sensor, a controller, a gas inlet port and a gas injection point, the gas injection point being coupled to the gas inlet port and opening into the channel at a point between the cavity and the cable outlet;
   wherein said longitudinal drive force in use causes the cable to be advanced along the channel, through the cavity, past the deflector and the gas injection point, and through the cable outlet into a duct connected thereto;

the sensor senses lateral deviation of the cable, said lateral deviation occurring when excessive longitudinal drive force causes the cable to buckle at the deflector;

the controller is responsive to the sensor to control the driver to vary the driving force applied by the at least one drive wheel in accordance with the output of the sensor; and a protrusion into the passageway of the curved deflector is not less than 0.5 mm but not greater than 1.5 mm.

8. A blowing head for a cable installation process, the blowing head comprising:

a cable inlet to receive a cable;

a cable outlet for connection to a duct into which the cable will be installed, the cable outlet being connected to the cable inlet by a connecting channel;

a driver;

at least one drive wheel coupled to said driver which, in use, drives the at least one drive wheel to apply a longitudinal drive force to the cable, a cavity contiguous with a channel, a deflector, a sensor, a controller, a gas inlet port and a gas injection point, the gas injection point being coupled to the gas inlet port and opening into the channel at a point between the cavity and the cable outlet;

wherein said longitudinal drive force in use causes the cable to be advanced along the channel, through the cavity, past the deflector and the gas injection point, and through the cable outlet into a duct connected thereto;

the sensor senses lateral deviation of the cable, said lateral deviation occurring when excessive longitudinal drive force causes the cable to buckle at the deflector;

the controller is responsive to the sensor to control the driver to vary the driving force applied by the at least one drive wheel in accordance with the output of the sensor; and the head further comprising a detector for detecting the axial direction of movement of the cable such that if the cable moves in a reverse direction, the controller directs the driver to increase the driving force applied by the at least one drive wheel until the cable is held in equilibrium.

9. A blowing head as claimed in claim 4, wherein the sensor comprises an optical source and an optical detector.

10. A method of installing a cable into a duct, the method comprising the steps of:

i) coupling a blowing head according to claim 1 to the duct;

ii) introducing said cable into the blowing head and engaging the cable with the rotatable driving element;

iii) applying pressurized gas to the duct;

iv) advancing the cable through the head and along the duct; and v) controlling the tractive force applied through the rotatable driving element in accordance with the output of said at least one sensor.

11. A blowing head for a blown cable installation process, comprising:

a motor;

a rotatable driving element operatively connected to the motor;

a cable inlet to receive a cable to be installed;

a cable outlet for connection to an installation duct into which the cable is to be installed, the cable outlet being connected to the cable inlet by a through-bore that defines a cable path along which the cable passes in use;

a rotation sensor to sense the direction of movement of the rotatable driving element; and a controller, operatively connected to the rotation sensor and to the motor, wherein in use the controller causes, in response to a detection of rotation of the driving element in the sense opposite to that which applies when the cable is being inserted into the duct, the motor to apply a holding torque to the rotatable driving element to counteract the opposite rotation.

12. A buckle detector for a blown cable installation process for use downstream of a tractor element of a blowing head, the detector comprising:

a cable inlet to receive a cable to be installed;

a cable outlet for connection to an installation duct into which the cable is to be installed, the cable outlet being connected to the cable inlet by a through-bore that defines a cable path along which the cable passes in use;

a cavity, through which the cable path passes;

at least one sensor for monitoring, in use, the position of the cable within the cavity; and a deflector on which the cable impinges on its passage along the cable path, the deflector being arranged to introduce a bend into the path followed by the cable;

wherein if the cable is propelled into the buckle detector with an excess of force the cable will preferentially buckle within the cavity at the site of the deflector.

13. A method of installing a cable into a duct, the method comprising the steps of:

i.) coupling a blowing head according to claim 4 to the duct;

ii) introducing a cable into the blowing head and engaging the cable with the rotatable driving element or wheel of the head;

iii) applying pressurized gas to the duct;

iv) advancing the cable through the head and along the duct; and v) controlling the tractive force applied through the rotatable driving element or wheel in accordance with the output of a sensor or sensors of the blowing head.

14. A blowing head as claimed in claim 1, wherein said deflector protrudes into said through-bore.

15. A blowing head as claimed in claim 4, wherein the deflector protrudes into said connecting channel.

* * * * *